United States Patent Office 3,274,229
Patented Sept. 20, 1966

3,274,229
DEHYDRATION OF PERFLUORINATED AMIDES TO PREPARE A PERFLUORINATED NITRILE
Carl J. Verbanic, Louisville, Ky., assignor to Hooker Chemical Corporation, Niagara Falls, N.Y., a corporation of New York
No Drawing. Filed June 17, 1963, Ser. No. 288,464
10 Claims. (Cl. 260—465.2)

This is a continuation-in-part of United States patent application Serial No. 811,813, filed May 8, 1959, now abandoned.

This invention relates to new and improved methods for dehydrating perfluorinated amides to yield corresponding perfluorinated nitriles.

More particularly, this invention relates to dehydrating such perfluorinated amides as perfluoroglutaramide, perfluorosuccinoamide and perfluoroadipoamide, to perfluoroglutaronitrile, perfluorosuccinonitrile and perfluoroadiponitrile.

In accordance with the present invention, perfluorinated amides of formula

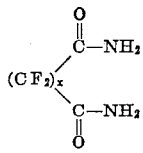

wherein x is from 2 to 4 are reacted with a compound selected from the group consisting of

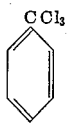

and

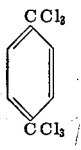

in the presence of a Lewis acid catalyst to produce a perfluorinated nitrile of formula

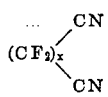

wherein $x$ is defined hereinbefore by this process, substantially quantitative yields of the dinitrile may be approached and yields greater than 55 percent, preferably more than 60 percent, of theoretical are obtainable, even without sophisticated equipment and reaction modifications.

EXAMPLE 1

Twenty-five grams (0.105 mole) of perfluoroglutaramide was added to sixty-one grams (0.312 mole) of benzotrichloride and eighteen grams of zinc chloride (1 percent). The mixture was heated to one hundred and eighty degrees centigrade. The nitrile was collected in a Dry Ice trap. After warming to room temperature to boil off the HCl gas, the residue was distilled to give a product having a boiling point of thirty-eight degrees centigrade. Infrared analysis showed the presence of the C≡N bond and no C=O bond.

The equation for the reaction of Example 1 is

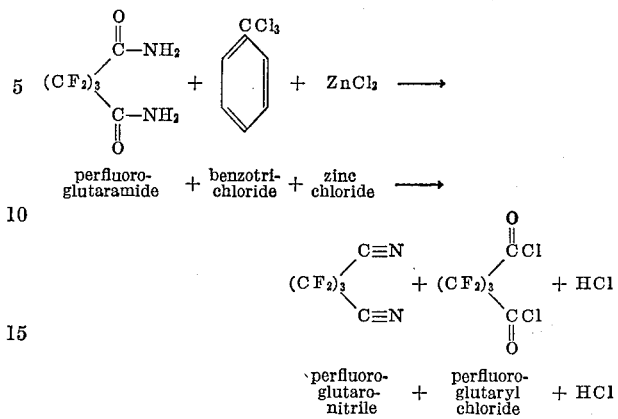

Instead of zinc chloride, suitable proportions, e.g., 0.2–5 percent by weight of the reactants of other Lewis acid catalysts such as aluminum and ferric chlorides and other known Lewis acid metallic chlorides may be substituted for the zinc chloride with similar good results.

Example 2 illustrates another dehydration method of this invention.

EXAMPLE 2

Into a one-liter, three-neck flask was placed four hundred milliliters of trichlorobenzene and two hundred and forty-four grams (1.25 moles) benzotrichloride and four grams $ZnCl_2$. The flask was fitted with a mechanical stirrer, vigreaux column with distilling head, thermometer and dripping funnel. The solvent and benzotrichloride was heated to one hundred and seventy degrees centigrade and the slow addition of a trichlorobenzene slurry of one hundred grams (0.42 mole) of perfluoroglutaramide started. The addition took 2.5 hours. The exit gases were cooled by a spiral condenser off the distilling head and cooled in a wet ice trap followed by a series of Dry Ice traps. The perfluoroglutaronitrile was collected in the Dry Ice traps. After addition of all the amide the temperature was raised to one hundred and ninety-five degrees centigrade, and a fraction collected which boiled at one hundred and ten degrees centigrade. After distillation of the products there was obtained thirty-five grams of perfluoroglutaronitrile (41.3 percent) and twenty-seven grams of perfluoroglutaryl chloride, B.P. one hundred and ten degrees centigrade (23.1 percent). Instead of benzotrichloride, xylene hexachloride may be used with similar results. This is also the case when perfluorosuccinamide and perfluoroadipamide are the starting materials.

The perfluorinated nitriles which may be produced in accordance with the teachings of the present invention are important intermediates in the preparation of perfluorinated diamidine elastomers as well as other useful plastics. Copolymers of perfluorinated diamidines and monoamidines give thermally stable fluids and elastomeric materials.

One of the problems in preparing perfluorinated nitriles, such as perfluoroglutaronitrile is that, with most dehydrating agents, the prefluorinated amides cyclize on dehydration, giving greater yields of the cyclic imides such as perfluoroglutarimide than of the disired nitrile. Another problem of the present invention was that even with benzotrichloride and xylene hexachloride, where the imide yield is low compared to the nitrile yield, other undesirable by-products are obtained unless the mole ratio of the dehydrating agent to the starting amide is carefully controlled. A clearer understanding of these problems will be evident after a consideration of the following table, in which are described the reagents employed and products obtained when following procedures like those of Examples 1 and 2.

*Dehydration of perfluoroglutaramide*

| Example | Dehydrating Reagent | Mole Ratio of Dehydrating Agent to the Perfluoroglutaramide | Nitrile Yield, Percent | Imide Yield, Percent | Perfluoroglutaryl Chloride Yield, Percent | Total Yield, Percent |
|---|---|---|---|---|---|---|
| 3 a | Benzotrichloride | 1:1 | 47.1 | 16.0 | 5.2 | 68.3 |
| 4 | do | 2:1 | 45.0 | 5.0 | 5.0 | 55.0 |
| 5 b | do | 3:1 | 43.4 | ------ | 29.6 | 73.0 |
| 6 b | do | 4:1 | 33.8 | ------ | 33.7 | 67.5 |
| 7 | do | 10:1 | 58.0 | ------ | 3.0 | 61.0 |
| 8 | do | 20:1 | 60.1 | ------ | ------ | 60.1 |
| 9 | Xylene Hexachloride | 5:1 | 60.6 | ------ | 3.5 | 64.1 |
| 10 | Benzoyl chloride | 3:1 | ------ | 60.0 | ------ | 60.0 | a The yields of dinitrile are further increased, to over 55% in Example 3, by fractionally separating the imide from the dinitrile and treating it with ammonia to produce the diamide which is mixed with feed diamide and is converted to the dinitrile.

b The yields of dinitrile are further increased, to over 55% in Examples 5 and 6, as well as in Examples 1 and 2, by reacting the diacid chloride made with ethanol at normal esterification temperatures and then converting the diester to the diamide by treatment with ammonia to produce the diamide which is mixed with the feed diamide and is converted to the dinitrile.

It will be apparent from a consideration of the foregoing chart that in Examples 3 and 4, the undesired imide and chloride by-products are both produced; that in Examples 5 and 6, the undesired imide is not obtained, but the yield of chloride becomes much greater and that in Example 7, the chloride yield is low and the nitrile yield is high. Example 9 employing xylene hexachloride, indicates that not as great a molar quantity of this dehydrating agent is required to reach an optimum nitrile yield as with benzotrichloride. Example 10 indicates the total unsuitability for use in the present invention of several dehydrating agents, typified by benzoyl chloride. Although benzoyl chloride itself is not suitable, it is made as a by-product in the present process from benzotrichloride. Thus, it is present and is available as a useful product of the reaction and does not prevent the production of the dinitrile in the present processes. Other reagents which were tested and found unsatisfactory for use in the present invention are thionyl chloride, phosphorus oxychloride, phosphorus pentachloride and acetic anhydride.

The dehydration reactions of this invention are best carried out in the presence of metallic chloride catalysts. Typical of such catalysts which may be used are the halides of zinc, aluminum, iron, boron and tin, such as zinc chloride, aluminum chloride, ferric chloride, stannic chloride and boron trifluoride.

The reaction temperatures employed will generally be between about one hundred and sixty degrees centigrade and two hundred and ten degrees centigrade and will preferably be between one hundred and ninety degrees centigrade and two hundred and ten degrees centigrade when using benzotrichloride. When using xylene hexachloride, the reaction temperature employed will generally be between about one hundred and sixty degrees centigrade and two hundred and fifty degrees centigrade and preferably between about one hundred and ninety degrees centigrade and two hundred and ten degrees centigrade. The reaction may be carried out in the presence or absence of inert solvents, such as dichlorobenzene or trichlorobenzene.

Molar ratios of benzotrichloride to the starting amide may be varied considerably. However, in order to suppress formation of undesirable by-products, mole ratios greater than 3:1 are required, even when utilizing recycle to raise the yields of dinitriles. Although ratios of 4:1 to 20:1 may be used, sometimes with recycle, the preferred mole ratios of benzotrichloride to the starting amide are between about 10:1 and about 50:1, to obtain best yields of the dinitrile without much imide or diacid chloride. The molar ratios of xylene hexachloride to the starting amide may also be varied considerably, the molar ratios required being generally one-half those required when using benzotrichloride. This is because of the two trichloromethyl groups in this compound.

As was mentioned previously, yields can be increased by reacting by-product diacid chloride material with lower alcohols, e.g., of 1 to 4 carbon atoms, to form esters, which are then ammoniated to diamides. Usually about molar equivalent proportions of alcohol and diacid chloride will be reacted and ammonia will be in excess, e.g., 1.1 to 10 molar equilavent ratio. Although the imide may be converted to the amide, too, its separation and reaction are more difficult and such procedure is less preferred.

Although this invention has been illustrated by citing specific details of given species embraced within the scope of the invention, it is to be understood that various modifications within the invention are possible, some of which have been referred to above; therefore, I do not wish to be limited except as defined by the appended claims.

What is claimed is:

1. A process for preparing a perfluorinated nitrile having the formula

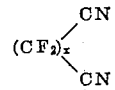

wherein $x$ is an integer from two to four, which comprises reacting with heat the corresponding perfluorinated amide having the formula

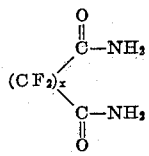

wherein $x$ is an integer from two to four with a material selected from the group consisting of benzotrichloride and xylene hexachloride in the presence of a metallic halide Lewis acid catalyst therefor, the reaction with benzotrichloride being conducted at a molar ratio of greater than 3 moles of benzotrichloride per mole of the perfluorinated amide, and the reaction with xylene hexachloride being conducted at a molar ratio of greater than 1.5 moles of xylene hexachloride per mole of the perfluorinated amide.

2. The process according to claim 1, when carried out in the presence of a metallic chloride Lewis acid catalyst, and when the molar ratios of benzotrichloride to perfluorinated amide are from about 10:1 to 50:1 and the molar ratios of xylene hexachloride to said amide are from about 5:1 to 25:1.

3. The process according to claim 1 wherein $x$ is 3.

4. The process of claim 2 wherein the metallic chloride catalyst is selected from the group consisting of zinc chloride, aluminum chloride and ferric chloride, and the catalyst is employed in a proportion of 0.2 to 5 percent by weight of the reactants.

5. The process of claim 4 wherein the perfluorinated amide is reacted with benzotrichloride in the presence of an inert solvent at a temperature of 160 to 210 degrees centigrade.

6. The process of claim 4 wherein the perfluorinated amide is reacted with xylene hexachloride in the presence of an inert solvent at a temperature of 160 to 250 degrees centigrade.

7. A process for preparing a perfluorinated nitrile having the formula

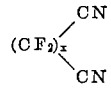

wherein $x$ is an integer from two to four, which comprises reacting with heat the corresponding perfluorinated amide having the formula

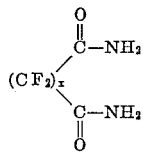

wherein $x$ is an integer from two to four, with a material selected from the group consisting of benzotrichloride and xylene hexachloride in the presence of a metallic halide Lewis acid catalyst, to produce the perfluorinated nitrile and the corresponding perfluoro diacid chloride, separating the perfluoro diacid chloride produced and reacting it with a lower alcohol of 1 to 4 carbon atoms to make the corresponding perfluoro diester, treating the resulting perfluoro diester with ammonia to convert it to the corresponding diamide and recycling the diamide so produced, with additional perfluoro diamide into reaction with the material selected from the group consisting of benzotrichloride and xylene hexachloride, the reaction with benzotrichloride being conducted at a molar ratio of greater than 3 moles of benzotrichloride per mole of the perfluorinated amide, and the reaction with xylene hexachloride being conducted at a molar ratio of greater than 1.5 moles of xylene hexachloride per mole of the perfluorinated amide.

8. A process according to claim 7 in which the perfluorinated amide is perfluoroglutaramide, which is reacted with benzotrichloride in the presence of 0.2 to 5 percent by weight of the reactants of zinc chloride.

9. A process for preparing a perfluorinated nitrile having the formula

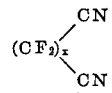

wherein $x$ is an integer from two to four, which comprises reacting with heat the corresponding perfluorinated amide having the formula

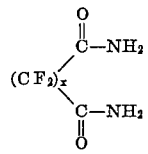

wherein $x$ is an integer from two to four, with a material selected from the group consisting of benzotrichloride and xylene hexachloride in the presence of a metallic halide Lewis acid catalyst, to produce the perfluorinated nitrile and the corresponding perfluorimide, separating the perfluorimide and reacting it with ammonia to convert it to the corresponding diamide and recycling the diamide so produced, with additional perfluorodiamide into the reaction with the material selected from the group consisting of benzotrichloride and xylene hexachloride, the reaction with benzotrichloride being conducted at a molar ratio of greater than 3 moles of benzotrichloride per mole of the perfluorinated amide, and the reaction with xylene hexachloride being conducted at a molar ratio of greater than 1.5 moles of xylene hexachloride per mole of the perfluorinated amide.

10. A process according to claim 9 in which the perfluorinated amide is perfluoroglutaramide which is recated with benzotrichloride in the presence of 0.2 to 5 percent by weight of the reactants of zinc chloride.

References Cited by the Examiner

UNITED STATES PATENTS

| 2,205,076 | 6/1940 | Wortz | 260—465.2 |
| 2,515,246 | 7/1950 | McBee et al. | 260—465.7 X |
| 2,788,362 | 4/1957 | Barnhart et al. | 260—465.2 |

FOREIGN PATENTS

| 323,948 | 1/1930 | Great Britain. |

CHARLES B. PARKER, *Primary Examiner.*

J. P. BRUST, *Assistant Examiner.*